Aug. 15, 1961 R. A. KIRK 2,995,974
FILM GATE

Filed May 7, 1958 2 Sheets-Sheet 1

ROBERT A. KIRK
INVENTOR.

BY

ATTORNEYS

Aug. 15, 1961 R. A. KIRK 2,995,974
FILM GATE
Filed May 7, 1958 2 Sheets-Sheet 2

ROBERT A. KIRK
INVENTOR.
BY R. Frank Smith
Paul R. Holmes
ATTORNEYS

United States Patent Office 2,995,974
Patented Aug. 15, 1961

2,995,974
FILM GATE
Robert A. Kirk, Rochester, N.Y., assignor to Eastman Kodak Company, Rochester, N.Y., a corporation of New Jersey
Filed May 7, 1958, Ser. No. 733,554
4 Claims. (Cl. 88—18)

The present invention relates to a film gate for use in a film handling apparatus and more particularly to a film gate designed to permit insertion of a film strip into the film gate without requiring the operator to touch any part of the film gate.

A great number of different and sometimes complicated film gates have been designed for use in various photographic apparatus. Many of the known film gates have required one member of the film gate to be manually moved to a position remote from the other member before the film strip can be positioned therebetween. In such cases difficulty has been encountered by some people in properly positioning film strip in the film gate because the film gate is formed of relatively small parts and is usually relatively inaccessible located. The film gate of the present invention comprises a movable pressure plate and a relatively fixed aperture plate and was designed to simplify the insertion and removal of film strip from the film gate of a photographic apparatus. According to the present invention a throat, formed by a beveled portion of the movable pressure plate and a fixed guide member, guides the longitudinal edge of the film strip into position between the plates during insertion of the film strip into the film gate, and manual movement or positioning of the pressure plate is not required. During removal of the film strip from the film gate, the film advancing claw is withdrawn from the perforation in the film strip releasing the film strip, and the pressure plate is pivoted away from the aperture plate by a distance sufficient to permit the complete withdrawal of the film strip from the film gate without requiring the operator to touch or move any part of the film gate structure.

The primary object of the present invention is, therefore, to provide a film gate for use in a film handling apparatus which permits the insertion or removal of film strip from the film gate without requiring the manual moving or touching of any part of the film gate prior to or during such insertion or removal.

Another object of the present invention is to provide a film gate for use in a film handling apparatus in which the natural rigidity of the film strip is utilized to open the film gate and permit the insertion of the film strip therein.

Still another object of the present invention is to provide a film gate for use in a film handling apparatus in which the natural rigidity of the film strip is utilized to open the film gate and to simultaneously withdraw the film advancing claw therefrom to permit the complete insertion and location of the film strip in the film gate.

Yet another object of the present invention is to provide a film gate for use in a film handling apparatus in which the natural rigidity of the film strip is utilized to open the film gate and retract the film advancing claw from the film gate to permit the withdrawal of the film strip from the film gate.

Still other objects and advantages of the present invention will become readily apparent to those skilled in the art from the following description with reference to the drawings in which like characters denote like parts and wherein.

Figure 1:
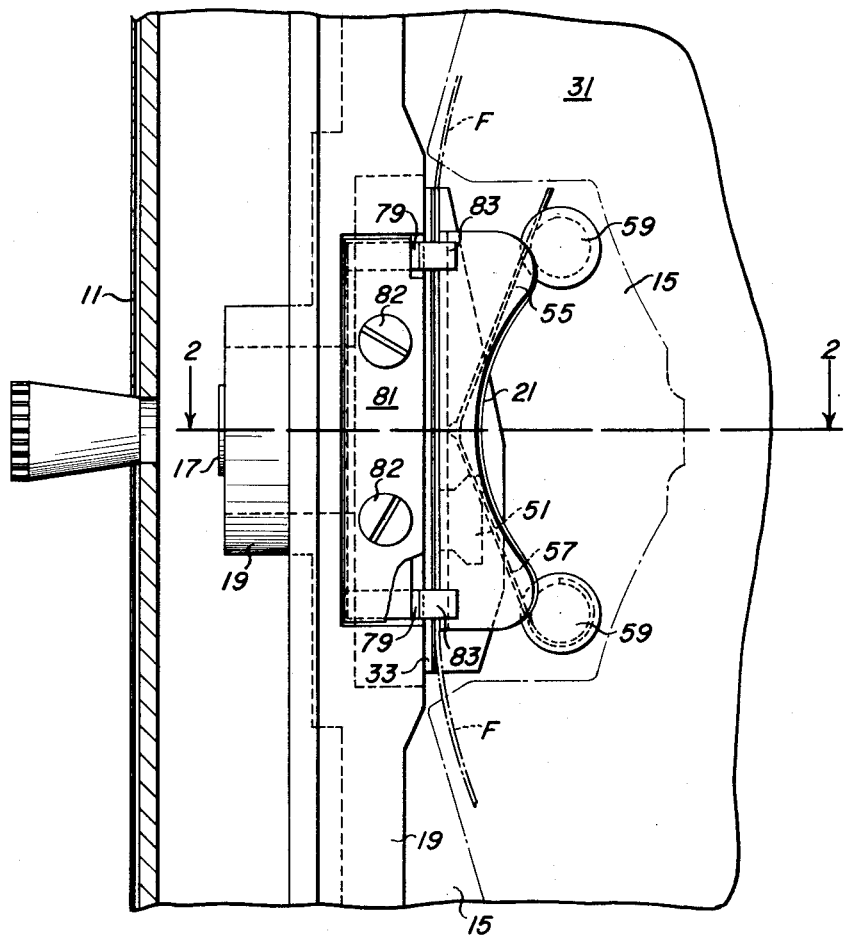
FIG. 1 is a plan view of the film gate of the present invention as utilized in a motion-picture camera.
Figure 6:
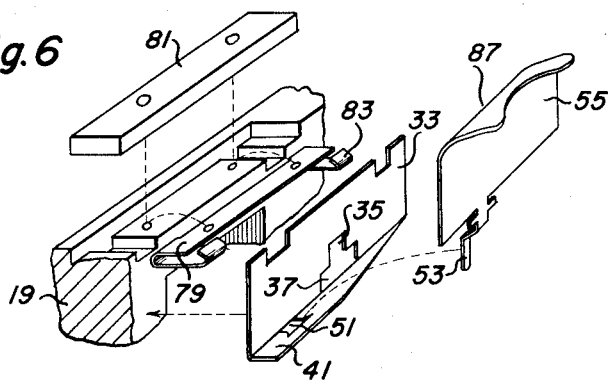
FIG. 6 is an exploded view showing the principal parts of the film gate of the present invention.

In FIG. 1, a motion-picture camera 11 is shown partly in section in order to facilitate the illustration of the film gate of the present invention and comprises a mechanism plate 15 forming a dividing wall between the magazine receiving chamber and the mechanism chamber of the camera, an optical system 17 mounted in the casting forming the shutter and lens housing 19, and the film gate generally designated by the numeral 21. The film strip F illustrated in FIG. 1 fully inserted in the film gate 21, is advanced from a supply spool (not shown) to a take-up spool (not shown) mounted within a film magazine 31. Film magazine 31 can be supported in the magazine receiving cavity of camera 11 by the mechanism plate 15 in any well-known manner. The film gate 21 comprises an aperture plate 33 which is rigidly mounted onto the rear of lens housing 19. Aperture plate 33 is provided with a suitable aperture 35 to permit the images transmitted by optical system 17 to be recorded on the film strip F. Aperture plate 33 also includes an elongate slot 37 adjacent aperture 35 for receiving the claw tooth 36 of film advancing claw 39 and permitting the required advancing movement thereof during engagement with the perforations in the film strip F. Aperture plate 33 is formed along the bottom edge thereof with a lip 41 which is substantially perpendicular to the plane of aperture plate 33. Lip 41 is provided with a T shaped slot 51 to permit a tang 53 provided on the lower edge of pressure plate 55 to extend therethrough. Pressure plate 55 is normally biased into engagement with the surface of aperture plate 33 by means of the leaf spring 57 which is supported in position within the camera 11 by a pair of upright posts 59 rigidly mounted on mechanism plate 15. The rounded ends 61 of posts 59 act as stop means to limit movement of pressure plate 55 as will be hereinafter set forth. The claw 39 is pivotally mounted about ball bearing 71 on a fixed bracket 73 carried on the underside of mechanism plate 15. Bearing 71 and claw 39 are secured in position on bracket 73 by a retaining strip 75 having a spring finger 76 for biasing claw 39 towards bracket 73 and aperture plate 33. Claw 39 is formed with an aperture 77 for receiving the cam mechanism (not shown) which converts rotary movement of the camera drive motor (not shown) to oscillatory movement. The oscillatory movement is imparted to claw tooth 36 which engages and advances film strip F through the film gate in a manner well known in the art. The specific structure of the cam mechanism and the camera drive motor can be in accordance with any of the well-known types and since these elements do not form a material part of the present invention, further description herein will not be undertaken. The tang 53 on pressure plate 55 extends through slot 51 in lip 41, best illustrated in FIG. 6, for engagement with claw 39 adjacent aperture 77, see FIGS. 3 and 5. Since pressure plate 55 is biased toward aperture plate 33 by spring 57, the line of contact of the lower edge of pressure plate 55 and the adjacent surface of lip 41 forms a fulcrum about which pressure plate 55 pivots with respect to aperture plate 33 when the film gate is opened during insertion or removal of film strip therefrom. Film gate 21 also includes a resilient spring clip 79, best illustrated in FIG. 6, which is retained on an upper surface of lens housing 19 by means of a flat plate 91 and suitable mounting screws 82. The beveled noses 83 of clip 79 extend through small slots 85 provided in the upper edge of aperture plate 33, and with the beveled portion 87 of pressure plate 55 form a throat 89 for guiding the longitudinal edge of the film strip F during insertion and removal from the film gate 21.

Figure 2:
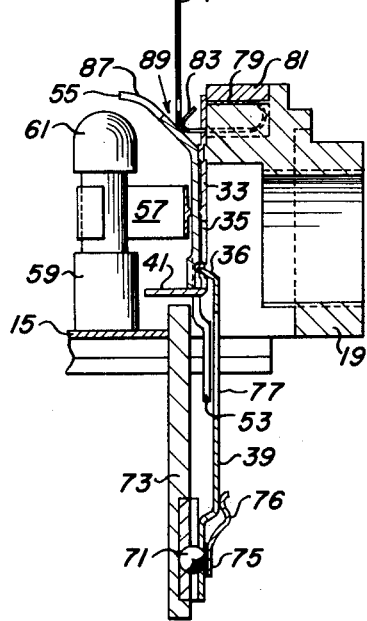
FIGS. 2, 3, 4 and 5 are cross sectional views taken along line 2—2 of FIG. 1 and illustrating the film gate during insertion and removal of the film strip therefrom.
Figure 3:
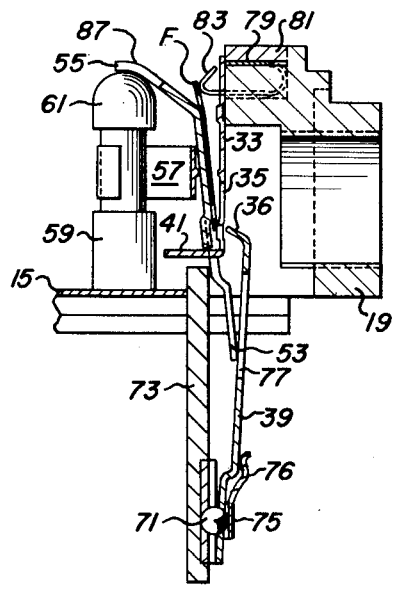
Figure 4:
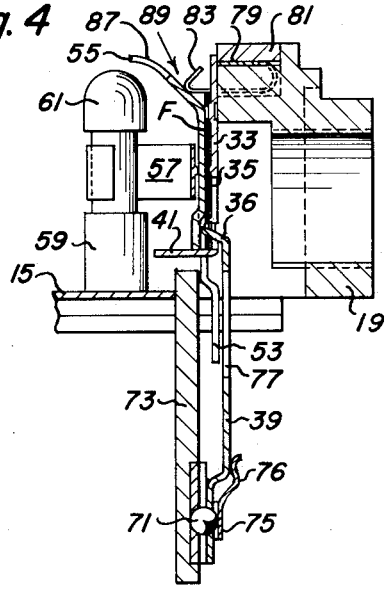

The operation of the film gate will now be described. To position the film strip F between the aperture plate 33 and pressure plate 55 and in operative relation to the claw tooth 36, the longitudinal edge of film strip F is first aligned in the throat 89 between the beveled noses 83 of clip 79 and the beveled portion 87 of pressure plate 55, as illustrated in FIG. 2 of the drawings. A downward force substantially in the direction of arrow 91, see FIG. 2, is applied to the film strip F tending to pivot pressure plate 55, against the bias of leaf spring 57, about the lower edge of pressure plate 55 until stopped by ends 61 of posts 59 and permitting the film strip F to be pushed further into the film gate 21. As shown in FIG. 3 the pivotal movement imparted to pressure plate 55 causes tang 53 to pivot into engagement with claw 39 and retract the claw tooth 36 from the slot 37 in aperture plate 33, thereby permitting film strip F to move fully into the film gate 21 with the lower longitudinal edge of the film strip in engagement with the upper surface of lip 41 as illustrated in FIG. 4. When the film strip F has been fully inserted into the film gate 21, pressure plate 55 is returned by spring 57 to engage film strip F between the pressure plate and aperture plate, and tang 53 is simultaneously pivoted away from claw 39 permitting spring finger 76 to return claw tooth 36 to the slot 37 for engagement in the perforation of the film strip F. In the event that the perforation is not aligned with the position of claw tooth 36, the tooth rests on the surface of the film strip and as soon as the camera drive motor is actuated, the tooth will slide over the surface of the film strip until it encounters the perforation at which time spring finger 76 will cause the claw tooth 36 to move into the film perforation in driving relationship to the film strip F. The motion-picture camera will then function in the normal manner with film strip F being advanced as desired by the camera drive mechanism. It should be noted that the film strip F when positioned in the film gate 21 is engaged along the upper longitudinal edge thereof by the underside of the noses 83 of spring clip 79 and is biased downwardly so that the lower longitudinal edge of the film strip F is maintained in engagement with and guided by the upper surface of lip 41.

Figure 5:
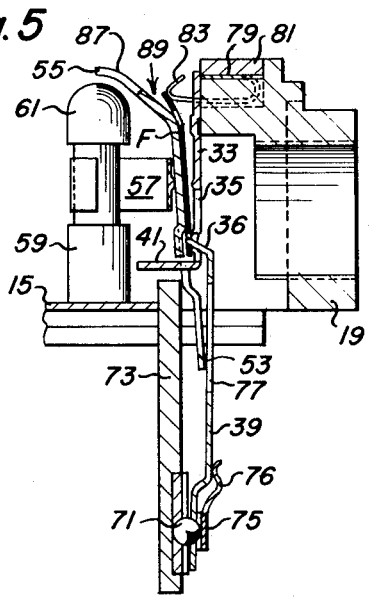

When it is desired to remove the film strip F from the film gate, a force is exerted on the film strip in a direction opposite to the direction of the arrow 91 shown in FIG. 2, which force tends to bend noses 83 of spring clip 79 upwardly as illustrated in FIG. 5. Because claw tooth 36 is not perpendicular to the surface of film strip F when engaged in the film strip perforation, the raising of the film strip out of the film gate 21 causes tooth 36 to slide out of the perforation and claw 39 is pivoted clockwise about bearing 71 as viewing in FIG. 5. As the film strip F is raised further from the film gate 21 the noses 83 of spring clip 79 which have been raised by the upper longitudinal edge of the film strip, tend to flex the film strip in throat 89 and the natural rigidity of the film strip pivots pressure plate 55 against the bias of spring 57 and away from aperture plate 33 permitting the complete withdrawal of the film strip F from the film gate 21.

It will now be appreciated by those skilled in the art that the film gate of the present invention permits film strip to be inserted or removed from the film gate without requiring the manual opening of the film gate or in fact the touching of any part of the film gate in any way. While the film gate of the present invention has been described for use in conjunction with an 8 mm. motion-picture camera, it is obvious that it could be utilized in other cameras as well as many other types of apparatus including for example, projectors, tape recorders, view- ers and enlargers. Thus, while only one specific embodiment has been shown and described, many modifications and variations are possible and will be readily recognized by those skilled in the art from the foregoing description which is intended therefore to be illustrative only and the scope of the invention is defined in the appended claims.

Having now particularly described my invention, what I desire to secure by Letters Patent of the United States and what I claim is:

1. A film gate for use in a film handling apparatus having a film strip engaging claw tooth for longitudinally advancing a film strip in a predetermined path, means for supporting said claw tooth in engagement with said film strip, and means for driving said claw tooth to advance said film strip, said film gate comprising an aperture plate carried by said apparatus and having an opening for receiving said claw tooth, means on said aperture plate for engaging and guiding said film strip along an edge thereof during the movement of the film strip through said film gate by said claw tooth, a pressure plate having a longitudinal edge extending parallel to the direction of advance of said film strip through said film gate, said pressure plate being mounted in said apparatus with said longitudinal edge in abutting contact with said engaging and guiding means for pivotal movement about said longitudinal edge between a first position adjacent to said aperture plate to support said film strip between said plates in edge contact with said engaging and guiding means and a second position relatively remote from said aperture plate to allow said film strip to be withdrawn from and inserted between said plates, means for maintaining said longitudinal edge in abutting contact with said engaging and guiding means when said pressure plate is in said first position, when in said second position and while moving between said first and second position, means for resiliently biasing said pressure plate to said first position, and means on said pressure plate for engaging said claw tooth supporting means upon movement of said pressure plate to said second position to withdraw said tooth from said opening, and for disengaging said claw tooth supporting means upon movement of said pressure plate to said first position and thereby allow said claw tooth supporting means to move said claw tooth into said opening, said pressure plate having an angularly disposed surface formed on an edge thereof remote from and substantially parallel to said longitudinal edge, said surface forming with said aperture plate a throat having a cross section of substantially V shape for guiding the edges and transverse surface of said film strip during its withdrawal from and insertion between said plates, whereby said pressure plate is moved to said second position in response to both the withdrawal and the insertion between said plates, of said film strip by the application of force to the film strip in the plane of the film strip and in a direction transverse to the direction of advance thereof through said film gate.

2. A film gate for use in a film handling apparatus having a film strip engaging claw tooth for longitudinally advancing a film strip in a predetermined path, means for supporting said claw tooth in engagement with said film strip, and means for driving said claw tooth to advance said film strip, said film gate comprising an aperture plate carried by said apparatus and having an opening for receiving said claw tooth, means on said aperture plate for engaging and guiding said film strip along an edge thereof during the movement of the film strip through said film gate by said claw tooth, a pressure plate having a longitudinal edge extending parallel to the direction of advance of said film strip through said gate, said pressure plate being mounted in said apparatus with said longitudinal edge in abutting contact with said engaging and guiding means, for pivotal movement about said longitudinal edge ebetween a first position adjacent to said aperture plate to support said film strip between said plates and a second position relatively remote from said aperture plate to allow said film strip to be withdrawn from and inserted between said plates, means for maintaining said longitudinal edge in abutting contact with said engaging and guiding means when said pressure plate is in said first position, when in said second position and while moving between said first and second position, means for resiliently biasing said pressure plate to said first position, means on said pressure plate for engaging said claw tooth supporting means upon movement of said pressure plate to said second position to withdraw said claw tooth from said opening, and for disengaging said claw tooth supporting means upon movement of said pressure plate to said first position and thereby allow said claw tooth supporting means to move said claw tooth into said opening, and means mounted in said apparatus adjacent to said aperture plate and engaging one of the edges of said film strip when positioned between said plates for resiliently biasing said film strip transversely into edge contact with said engaging and guiding means, said pressure plate having an angularly disposed surface formed on an edge thereof remote from and substantially parallel to said longitudinal edge, said surface forming with said film strip biasing means a throat for guiding the edges and transverse surface of said film strip during its withdrawal from and insertion between said plates, whereby said pressure plate is moved to said second position in response to both the withdrawal from and the insertion between said plates, of said film strip by the application of force to the film strip in the plane of the film strip and in a direction transverse to the direction of advance thereof through said film gate.

3. A film gate for use in a film handling apparatus having a film strip engaging claw tooth for longitudinally advancing a film strip in a predetermined path, means for supporting said claw tooth in engagement with said film strip, and means for driving said claw tooth to advance said film strip, said film gate comprising an aperture plate carried by said apparatus and having an opening for receiving said claw tooth, flange means on said aperture plate for engaging and guiding said film strip along an edge thereof during movement of the film strip through said film gate by said claw tooth, a pressure plate having a longitudinal edge extending parallel to the direction of advance of said film strip through said film gate, said pressure plate being mounted in said apparatus with said longitudinal edge retained in abutting contact with said flange means for pivotal movement about said longitudinal edge between a first position adjacent to said aperture plate to support said film strip between said plates and a second position relatively remote from said aperture plate to allow said film strip to be withdrawn from and inserted between said plates, means for resiliently biasing said pressure plate to said first position, means carried by said pressure plate for engaging said claw tooth supporting means upon movement of said pressure plate to said second position to withdraw said tooth from said opening, and for disengaging said claw tooth supporting means upon movement of said pressure plate to said first position and thereby allow said claw tooth supporting means to move said claw tooth into said opening, and resilient clip means mounted in said apparatus adjacent to said aperture plate and engaging one of the edges of said film strip when positioned between said plates for resiliently biasing said film strip transversely into edge contact with said flange means, said pressure plate having an angularly disposed surface formed on an edge thereof remote from and substantially parallel to said longitudinal edge, said surface forming with said clip means a throat for guiding the edges and transverse surface of said film strip during its withdrawal from an insertion between said plates, whereby said pressure plate is moved to said second position in response to both the withdrawal from and the insertion between said plates, of said film strip by the application of force to the film strip in the plane of the film strip and in a direction transverse to the direction of advance thereof through said film gate.

4. A film gate for use in a film handling apparatus having a film strip engaging claw tooth for longitudinally advancing a film strip in a predetermined path, means for supporting said claw tooth in engagement with said film strip, and means for driving said claw tooth to advance said film strip, said film gate comprising an aperture plate carried by said apparatus and having an opening for receiving said claw tooth, a flange on said aperture plate for guiding said film strip along an edge thereof during movement of the film strip through said film gate by said claw tooth, said flange having a slot positioned adjacent to said aperture plate and extending through said flange, a pressure plate having a longitudinal edge extending parallel to the direction of advance of said film strip through said film gate, said pressure plate being mounted in said apparatus with said longitudinal edge retained in abutting contact with said flange for pivotal movement about said longitudinal edge between a first position adjacent to said aperture plate to support said film strip between said plates and a second position relatively remote from said aperture plate to allow said film strip to be withdrawn from and inserted between said plates, means for resiliently biasing said pressure plate to said first position, an elongate tang carried by said pressure plate and extending through said slot for engaging said claw tooth supporting means upon movement of said pressure plate to said second position to withdraw said tooth from said opening and for disengaging said claw tooth supporting means upon movement of said pressure plate to said first position and thereby allow said claw tooth supporting means to move said claw tooth into said opening, and a resilient clip mounted in said apparatus adjacent to said aperture plate for engaging one of the edges of said film strip when positioned between said plates to resiliently bias said film strip transversely into edge contact with said flange, said pressure plate having an angularly disposed surface formed on an edge thereof remote from and substantially parallel to said longitudinal edge, said surface forming with said clip a throat having a cross section of substantially V shape for guiding the edges and transverse surface of said film strip during its withdrawal from and insertion between said plates, whereby said pressure plate is moved to said second position in response to both the withdrawal from and the insertion between said plates, of said film strip by the application of force to the film strip in the plane of the film strip and in a direction transverse to the direction of advance thereof through said film gate.

References Cited in the file of this patent

UNITED STATES PATENTS

| | | |
|---|---|---|
| 1,909,759 | Goldhammer | May 16, 1933 |
| 1,944,031 | Laug et al. | Jan. 16, 1934 |
| 2,089,276 | Lindstrom et al. | Aug. 10, 1937 |
| 2,232,811 | Sperry | Feb. 25, 1941 |
| 2,457,915 | Nemeth | Jan. 4, 1949 |
| 2,646,718 | Favre | July 28, 1953 |
| 2,762,256 | Gottschalk | Sept. 11, 1956 |
| 2,874,607 | Witkowski | Feb. 24, 1959 |

FOREIGN PATENTS

| | | |
|---|---|---|
| 215,934 | Australia | July 15, 1958 |
| 422,147 | Italy | June 11, 1947 |
| 1,156,781 | France | Dec. 16, 1957 |